(12) United States Patent
Beckenhauer

(10) Patent No.: US 6,235,219 B1
(45) Date of Patent: May 22, 2001

(54) COMPOSITIONS USEFUL AS DESICCANTS AND METHODS RELATING THERETO

(76) Inventor: Thomas Beckenhauer, 702 13th St. Southeast, Puyallup, WA (US) 98372

( * ) Notice: Subject to any disclaimer, the term of this patent is extended or adjusted under 35 U.S.C. 154(b) by 0 days.

(21) Appl. No.: 09/366,289

(22) Filed: Aug. 2, 1999

(51) Int. Cl.⁷ .................................................. C09K 3/00
(52) U.S. Cl. ............................................. 252/194; 204/551
(58) Field of Search ............................. 252/194; 204/551

(56) References Cited

U.S. PATENT DOCUMENTS

| | | | |
|---|---|---|---|
| 2,388,390 | * 11/1945 | Cook et al. | 252/194 |
| 2,933,455 | * 4/1960 | Doying | 252/194 |
| 2,967,153 | * 1/1961 | Houston | 252/194 |
| 3,912,520 | * 10/1975 | Miyajima et al. | 106/22 |
| 4,615,823 | * 10/1986 | Tokuyama et al. | 252/194 |
| 5,078,909 | * 1/1992 | Shigeta et al. | 252/194 |
| 5,788,990 | * 8/1998 | Akamatsu et al. | 424/489 |
| 5,820,955 | * 10/1998 | Brander | 428/35.7 |
| 5,935,304 | * 8/1999 | Shelley et al. | 96/118 |

* cited by examiner

*Primary Examiner*—T. Tung
*Assistant Examiner*—LaToya I. Cross
(74) *Attorney, Agent, or Firm*—Seed Intellectual Property Law Group PLLC

(57) ABSTRACT

Compositions useful as desiccants are disclosed. The compositions may be prepared by admixing components comprising a hygroscopic material and an organic polymer in a solvent to form a solution, followed by drying the solution to remove solvent and provide a moisture-deficient hygroscopic material dispersed in the organic polymer. Alternatively, the compositions may be prepared by admixing components comprising a hygroscopic material and molten organic polymer to form a fluid admixture, followed by cooling the fluid admixture to a non-fluid state. The compositions of the present invention may comprise (1) a hygroscopic material dispersed in polyvinyl alcohol, (2) a deliquescent material dispersed in an organic polymer, or (3) hygroscopic material and polymeric material both dissolved in solvent.

8 Claims, No Drawings

COMPOSITIONS USEFUL AS DESICCANTS AND METHODS RELATING THERETO

TECHNICAL FIELD

The present invention relates generally to compositions useful as desiccants and, more specifically, to a composition formed from the combination comprising a hygroscopic material dispersed in an organic polymer such as polyvinyl alcohol, as well as methods relating thereto.

BACKGROUND OF THE INVENTION

There are many materials in need of protection from atmospheric moisture, particularly in the context of specialty goods manufactured by the pharmaceutical, chemical, computer, electronics, military, and food industries. In particular, water vapor in the air is known to have harmful effects on numerous specialty goods, and in the context of frequently opened and resealed products, these harmful effects are often amplified. Accordingly, and in an effort to reduce the damage caused by ambient water vapor, a desiccant typically accompanies those specialty goods in need of moisture protection. For example, pouched or otherwise packaged desiccants routinely accompany specialty goods as part of the product packaging, or in some cases as an integral component of the good itself.

In these types of situations, the accompanying desiccant is able to absorb and hold moisture that would otherwise be in the atmosphere contacting the specialty good (i.e., in the surrounding volume of air) to thereby prevent or reduce the harmful effects that may be caused by ambient water vapor. Although desiccants are of great commercial value, there are, surprisingly, only three major types of desiccants currently available, namely; (1) montmorillonite clay; (2) silica gel; and (3) molecular sieve.

As is known to those skilled in the art, montmorillonite clay is a naturally-occurring calcium aluminum silicate type of hydrous clay; furthermore, it is a non-hazardous material which is typically ground, processed, and bagged prior to use as a desiccant. Similarly, silica gel is a form of sponge-like silica manufactured from sodium silicate and sulfuric acid, and like montmorillonite clay, it is a non-hazardous material which is typically bagged prior to use as a desiccant. Finally, molecular sieve is a manufactured crystalline version of zeolite containing a network of uniform pores and empty cavities, and it too is a non-hazardous material which is typically bagged prior to use as a desiccant.

A common attribute of fresh desiccant is its ability to absorb and hold water. For example, in an atmosphere having 100% humidity, the three commercially available desiccants mentioned above are able to absorb water in an amount ranging from approximately 28% to 40% of their respective masses. Once, however, the desiccant has absorbed its holding capacity of water, it is no longer effective and must be replenished. Although the desiccant may be recharged by removal of the absorbed moisture by, for example, dry heating, this practice is generally not employed because it is considered cost prohibitive; that is, it is usually much cheaper to simply replace the spent desiccant with fresh desiccant.

A significant factor contributing to the high costs associated with desiccant replacement is that the three commercially available desiccants are, as noted above, typically bagged prior to use. In others words, granules of montmorillonite clay, silica gel, or molecular sieve (in selected amounts) are usually placed within a porous pouch or receptacle prior to their accompaniment with the specialty good in need of moisture protection. This practice of desiccant bagging increases the costs of spent desiccant recharging significantly because the bag is generally removed prior to dry heating (thereby making it more economical to simply replace the spent desiccant with new desiccant). A related problem with desiccant bagging is that the resulting bagged desiccant may have a tendency to shift or move about during transportation of the specialty good; such movement may have undesirable consequences.

Accordingly, there is a need in the art for new compositions useful as desiccants, as well as for methods of making and using such new compositions. The present invention fulfills these needs, and provides for further related advantages as disclosed herein.

SUMMARY OF THE INVENTION

In brief, the present invention is directed to compositions useful as desiccants and, more specifically, to one or more compositions comprising (1) a hygroscopic material dispersed in polyvinyl alcohol, (2) a deliquescent material dispersed in an organic polymer, or (3) hygroscopic material and polymeric material both dissolved in solvent, as well as methods relating thereto. In one embodiment, the composition comprises a hygroscopic material dispersed in polyvinyl alcohol, wherein the hygroscopic material is not polyvinyl alcohol. In this embodiment, the hygroscopic material and the polyvinyl alcohol are generally moisture deficient. In addition, the hygroscopic material generally comprises one or more of calcium chloride, phosphorous oxide, sodium silicate, potassium silicate, potassium acetate, bentonite, montmorillonite clay, silica gel, molecular sieve, monohydric compounds, or polyhydric compounds. Preferably, the composition associated with this embodiment is about 25–75 wt % hygroscopic material and about 75–25 wt % polyvinyl alcohol, where the wt % values are based on the total weight of hygroscopic material and polyvinyl alcohol.

In another embodiment, the composition comprises a deliquescent material dispersed in an organic polymer. In this embodiment, the deliquescent material may comprise moisture deficient calcium chloride and/or potassium acetate. In addition, the organic polymer is generally one or more of polyvinyl alcohol, polyvinyl acetate, polyurethane, poly(acrylate), and polystyrene. Preferably, the composition associated with this embodiment is about 25–75 wt % deliquescent material and about 75–25 wt % organic polymer, where the wt % values are based on the total weight of moisture-free deliquescent material and polymer.

In yet another embodiment, the composition comprises hygroscopic material and polymeric material both dissolved in solvent. In this embodiment, the hygroscopic material may comprise a deliquescent material, potassium acetate, and/or calcium chloride, and the polymeric material may comprise polyvinyl alcohol. The solvent may comprise water.

The compositions associated with the first two above-identified embodiments may further comprise a solid support. More specifically, the one or more compositions comprising (1) a hygroscopic material dispersed in polyvinyl alcohol, or (2) a deliquescent material dispersed in an organic polymer, may further include a solid support, wherein a mixture of such materials is distributed across a surface of the solid support.

The present invention is also directed to methods. More specifically, the present invention is also directed to: (1) a method for removing moisture from an enclosed and moisture-containing atmosphere comprising contacting the atmosphere with polyvinyl alcohol, the polyvinyl alcohol being moisture deficient; (2) a method of making a composition useful as a desiccant comprising the steps of admixing components comprising a hygroscopic material and an organic polymer in a solvent to form a solution, and drying the solution to remove solvent and provide a moisture-deficient hygroscopic material dispersed in the organic polymer; and (3) a method of method of making a composition useful as a desiccant comprising the steps of admixing components comprising a hygroscopic material and molten organic polymer to form a fluid admixture, and cooling the fluid admixture to a non-fluid state.

These and other aspects of the present invention will be evident upon reference to the following detailed description.

DETAILED DESCRIPTION OF THE INVENTION

As mentioned above, the present invention relates generally to compositions useful as desiccants and, more specifically, to a composition formed from the combination comprising a hygroscopic material dispersed in an organic polymer such as polyvinyl alcohol, as well as methods relating thereto.

In one embodiment, the composition comprises a hygroscopic material dispersed in polyvinyl alcohol, wherein the hygroscopic material is not polyvinyl alcohol. As used herein, the term "hygroscopic material" refers to any chemical substance that has the ability to absorb moisture from air and includes hydrophilic materials as well as adsorbents and absorbents. Suitable hygroscopic materials of the present invention include (but are not limited to): calcium chloride, phosphorous oxide, sodium silicate, potassium silicate, potassium acetate, bentonite, montmorillonite clay, silica gel, molecular sieve, monohydric compounds, or polyhydric compounds. Preferably, the hygroscopic material comprises calcium chloride and/or potassium acetate. In addition, the compositions associated with this embodiment are preferably about 25–75 wt % hygroscopic material and about 75–25 wt % polyvinyl alcohol, where the wt % values are based on the total weight of hygroscopic material and polyvinyl alcohol.

In another embodiment of the present invention, the composition comprises a deliquescent material dispersed in an organic polymer. In this embodiment, the deliquescent material may comprise moisture deficient calcium chloride and/or potassium acetate. In addition, the organic polymer is generally one or more of polyvinyl alcohol, polyvinyl acetate, polyurethane, poly(acrylate), and polystyrene. Preferably, the organic polymer is polyvinyl alcohol, and the deliquescent material is moisture deficient calcium chloride or potassium acetate. In addition, the compositions associated with this embodiment are preferably about 25–75 wt % deliquescent material and about 75–25 wt % organic polymer, where the wt % values are based on the total weight of moisture-free deliquescent material and polymer.

In yet another embodiment of the present invention, the composition comprises hygroscopic material and polymeric material both dissolved in solvent. In this embodiment, the hygroscopic material may comprise a deliquescent material, potassium acetate, and/or calcium chloride, and the polymeric material may comprise polyvinyl alcohol. The solvent may comprise water.

In still yet another embodiment of the present invention, the composition comprises polymeric materials in combination with hygroscopic materials other than montmorillonite clay, polyvinyl alcohol, silica gel, and/or molecular sieve. In this embodiment, the polymeric material may comprise polyvinyl acetate and the hygroscopic material may comprise potassium bromide. Other suitable hygroscopic materials of this embodiment include (but are not limited to): calcium chloride, potassium acetate, cobalt chloride, phosphorous oxide, sodium silicate, monohydric compounds, polyhydric compounds, potassium silicate, and polysaccharides such as starch and cellulose.

As noted above, a composition in accordance with the present invention may comprise a hygroscopic material that consists essentially of calcium chloride (i.e., $CaCl_2$) or potassium acetate (i.e., $CH_3COOK$) dispersed in polyvinyl alcohol (i.e., PVOH). More specifically, it has been discovered that the combination of $CaCl_2$ or $CH_3COOK$ and PVOH (as well as various combinations thereof), in a solid matrix form, provides for a composition that has superior utility as a desiccant.

The calcium chloride useful in the present invention has the chemical formula $CaCl_2$, and may or may not contain waters of absorption. Preferably, the $CaCl_2$ is anhydrous; however, it may be partially hydrated. $CaCl_2$, in anhydrous form, is a colorless, grainy and extremely hygroscopic, cubic crystalline mass. $CaCl_2$ is also an extremely soluble salt that is typically prepared by the evaporation of underground brines. In the laboratory, $CaCl_2$ may be produced by treating the oxide, hydroxide, or carbonate of calcium with hydrochloric acid. $CaCl_2$ is available commercially from a number of suppliers, where Tetra Technologies, Inc. (The Woodlands, Tex.) is a representative supplier of $CaCl_2$.

The potassium acetate useful in the present invention has the chemical formula $CH_3COOK$, and may or may not contain waters of absorption. Preferably, the $CH_3COOK$ is anhydrous; however, it may be partially hydrated. $CH_3COOK$, in anhydrous form, is a colorless, hygroscopic, very water-soluble crystal with a silky sheen. $CH_3COOK$ is usually made by neutralizing acetic acid with potassium hydroxide or potassium carbonate. $CH_3COOK$ is available commercially from a number of suppliers, where Sigma-Aldrich Corporation (St. Louis, Mo.) is a representative supplier of $CH_3COOK$.

PVOH is generally (depending on its form) a white to cream granular powder, having a bulk density of about 40 lbs./cu. ft and a Tg (° C.) of about 75–85. As is appreciated by those skilled in the art, PVOH is typically prepared by hydrolyzing polyvinylacetate, where polyvinylacetate is typically prepared by homopolymerization of vinyl acetate. PVOH is also typically characterized in terms of its hydrolysis percent, where hydrolysis percent reflects the percentage of the acetate groups of the polyvinylacetate which were hydrolyzed in order to form the PVOH. The PVOH of the present invention has the minimum hydrolysis necessary to define itself as PVOH, preferably, however, it has at least about 50% hydrolysis, and more preferably it has about 95%–99.999% hydrolysis, according to values provided by the manufacturer. PVOH is available commercially from a number of suppliers, where Air Products (Allentown, Pa.) is a representative supplier of PVOH. The primary repeating unit in polyvinyl alcohol (i.e., polyvinylacetate with at least 50% hydrolysis of the acetate units) is the vinyl alcohol moiety; at a minimum two vinyl alcohol monomer units are needed to form PVOH.

The PVOH of the present invention may be characterized in terms of its molecular weight. The number average molecular weight of the PVOH used in the compositions of the present invention is at least about 2,000, and preferably is from about 7,000 to about 1,000,000. The weight average molecular weight of the PVOH is at least about 100, and preferably is from about 190,000 to about 500,000.

The PVOH is preferably dissolved in water before being combined with the hygroscopic material, e.g., $CaCl_2$ and/or $CH_3COOK$, although it may be dissolved in non-aqueous solvents in alternative embodiments (e.g., low molecular weight alcohols such as methanol, ethanol, or propanol). Techniques to dissolve PVOH in water are known in the art, and are illustrated further in the Examples herein. As a general procedure, the PVOH is gradually added to cold or room temperature water, using sufficient agitation to wet out all particles with water and form a dispersion. The water is preferably undergoing mechanical agitation during the addition of the PVOH. In situations where the PVOH will not readily dissolve in cold or room temperature water, the dispersion should be heated to obtain a solution. The heating temperature is generally at least about 50° C., and is preferably in the range of about 80° C.–100° C. (ca. 180° F.–212° F.), and upon being maintained within this temperature range for about 30 minutes, the dispersion of PVOH in water will form an aqueous solution of PVOH. The aqueous solution of PVOH may be cooled back to room temperature, and will remain as a solution. Alternatively, an aqueous solution of PVOH may be prepared by jet cooking.

The PVOH aqueous solution preferably contains about 0.001%–50% by weight PVOH, and more preferably about 30%–35% by weight PVOH. In general, the upper limit to the PVOH concentration in water is determined only by the solubility of the resulting aqueous solution. As the content of PVOH increases, the solution becomes more viscous and less easy to handle, and at above about 50% by weight, PVOH solutions are very viscous and difficult to work with. The precise PVOH content of the PVOH aqueous solution used in accordance with the present invention will depend upon the exact identity, e.g., the molecular weight and/or hydrolysis percent, of the PVOH used.

The hygroscopic material may likewise be dissolved or dispersed in water, before being combined with the PVOH solution. With some of the hygroscopic mateials, e.g., $CaCl_2$ or $CH_3COOK$, it is very easy to dissolve them in water because they are quite water soluble. A $CaCl_2$ and/or $CH_3COOK$ aqueous solution preferably contains about 0.001%–99.999% by weight $CaCl_2/CH_3COOK$, and more preferably about 30%–65% by weight $CaCl_2/CH_3COOK$. In an alternative embodiment, dry $CaCl_2$ and/or $CH_3COOK$ is added directly to the PVOH aqueous solution. If the hygroscopic material is not readily water soluble, it may be dispersed in the water, and the aqueous dispersion combined with the PVOH solution, or the hygroscopic material may be added in dry powder form to the PVOH solution, with agitation.

As noted above, a composition in accordance with the present invention may be formed by mixing $CaCl_2$ and/or $CH_3COOK$ and/or other hygroscopic material together with PVOH so as to form an aqueous solution or dispersion, followed by drying the formed solution or dispersion to moisture loss stability so as to generate a film that may be advantageously used as a desiccant. As used herein, the term "moisture loss stability" refers to a level of dryness beyond which no further appreciable weight loss can be attained through further drying. More specifically, a novel composition may be formed by combining, during an approximate 30 minute cook and stir process, appropriate volumes of a PVOH solution and either a $CaCl_2$ solution or a $CH_3COOK$ solution. The exact volumes of either solution is not critical; however, it is preferred that the respective amounts of solutes are such that end-product composition may be characterized as follows: the amount of $CaCl_2$ or $CH_3COOK$ by weight ranges from 0.001% to 70% and the amount of PVOH ranges 0.001% to 70%, preferably the amount of $CaCl_2$ or $CH_3COOK$ by weight ranges from 25% to 75% and the amount of polyvinyl alcohol ranges 25% to 75%.

The resulting aqueous solution having PVOH and $CaCl_2$ or $CH_3COOK$ is then appropriately dried to moisture loss stability through the use of an oven. Preferably, the oven is ventilated with dry air and maintained at a temperature between 38° C.–93° C. (ca. 100° F.–200° F.) for a period of time ranging from 10 minutes to over 24 hours (depending on specific drying conditions and amount of water to be removed). The drying step is continued until essentially all of the water has been removed, thereby generating a film comprising PVOH and hygroscopic material, both in moisture-deficient form.

It has been surprisingly found that PVOH alone has desiccating properties. Thus, a moisture-deficient film or pellet of or containing PVOH, is able to adsorb moisture from the atmosphere. Accordingly, the present invention provides a method for removing moisture which comprises contacting a moisture-containing atmosphere with moisture-deficient PVOH. As used herein, moisture-deficient PVOH is PVOH that upon being placed in an enclosed space with moisture-containing atmosphere, is able to reduce the moisture content of moisture-containing atmosphere. Typically, the atmosphere is moisture-containing air. An enclosed space is a space which encloses an atmosphere such that the atmosphere is not in immediate equilibrium with the atmosphere outside of the enclosed space. The moisture content of the atmosphere may be measured by determining the humidity of the atmosphere, where techniques to determine humidity are well known.

In another embodiment, the present invention provides a composition that includes a deliquescent material dispersed in an organic polymer. As used herein "a deliquescent material" refers to one or more unique deliquescent materials, while "an organic polymer" refers to one or more unique organic polymers. Also as used herein, the term deliquescent material refers to a substance that gradually becomes liquid by absorption of moisture from the atmosphere. Deliquescent materials are thus an example of a hygroscopic material, where all hygroscopic materials may absorb moisture from the atmosphere, but deliquescent are further characterized by turning fluid when they absorb moisture. Molecular sieves and silica are examples of hygroscopic materials that do not undergo deliquescence upon absorbing moisture.

Because the deliquescent material is dispersed in an organic polymer, the deliquescent material will tend to stay in contact with the organic polymer, even as the deliquescent material absorbs moisture. The organic polymer is preferably a solid at room temperature. Accordingly, the composition comprising a deliquescent material and an organic polymer will tend to remain solid even as the deliquescent material absorbs moisture. A composition that remains solid even after absorption of moisture from the atmosphere is expected to achieve greater commercial acceptance as a desiccant than will a composition that turns liquid, e.g., a deliquescent material alone, upon absorption of moisture. The present invention thus provides an advantageous approach to allowing deliquescent materials to function in commercial packaging as desiccant materials. The deliquescent material in the composition is preferably moisture-deficient in order that the composition can function as a desiccant.

In the composition comprising a deliquescent material dispersed in an organic polymer, the organic polymer is a carbon and hydrogen-containing substance with repeating units and a weight average molecular weight in excess of 30. Suitable organic polymers include, but are not limited to: polyvinyl alcohol, polyvinyl acetate, polyurethanes, poly (alkylmethacrylates) such as poly(methylmethacrylate), poly(ethylmethacrylate), poly(propylmethacrylate), and poly(butylmethacrylate), epoxies, natural and synthetic rubber, polyvinylidene chloride, polyesters, natural resins such as rosin, shellac, linseed oil, capal, dammar, amber, and mastic, aloe, labdanum, cellulose acetate, cellulose, alkyd resins, esters of polycarboxylic acids and polyhydroxyl alcohols, styrene butadiene resins and latexes, vinyl resins, poly(vinyl toluene), phenolics, urethanes, polyethylene, polyamides (i.e., nylons), silicones, tetrafluoroethylene (i.e., TEFLON), acrylonitrile, collodion (i.e., guncotton dissolved in alcohol or ether), natural and synthetic waxes, oils, gelatin, pectin, acetate fiber, vinyl acetate, vinyl chloride, and the like.

Preferred organic polymers are polyvinyl alcohol, polyvinyl acetate, polyurethane, poly(acrylate), and polystyrene. In a preferred embodiment, the organic polymer is polyvinyl alcohol.

The organic polymer preferably has moisture-adsorbing properties, i.e., it is preferred that the organic polymer can adsorb moisture from the air and/or, more preferably, may adsorb moisture from the deliquescent material. When the organic polymer is able to adsorb moisture from the deliquescent material, then the organic polymer effectively functions to retain the deliquescent material in a relatively moisture-free, and hence relatively solid, state.

The deliquescent material in the composition comprising organic polymer and deliquescent material is preferably moisture deficient. That is, the deliquescent material is still capable of absorbing moisture from the atmosphere. In a more preferred embodiment, the deliquescent material is substantially moisture deficient, that is, is able to absorb substantial amounts of moisture from the atmosphere. In preferred embodiment, the deliquescent material comprises calcium chloride and/or comprises potassium acetate.

In the compositions, there is both deliquescent material and organic polymer. Typically, about 25–75 wt % of the composition is deliquescent material, and about 75–25 wt % of the composition is organic polymer, where the wt % values are based on the total weight of moisture-free deliquescent material and polymer. In a preferred embodiment, about equal weights of deliquescent material and organic polymer are present in the composition.

In order to further enhance the ability of the composition comprising deliquescent material to retain a solid form even with the absorption of moisture, the composition preferably further includes a solid support, wherein a mixture of deliquescent material and organic polymer are distributed across a surface of the solid support. Suitable solid supports are, for example and without limitation, paper product, wood products, natural or synthetic sponges, cotton, synthetic fibers, charcoal, pumice, and porous rock.

The composition comprising a deliquescent material dispersed in an organic polymer may be prepared according to the same means as set forth above in describing the composition comprising a hygroscopic material dispersed in PVOH. Thus, both the deliquescent material and the polymer may be dissolved and/or dispersed in a suitable solvent, then the two mixtures combined and dried to moisture-loss stability. Alternatively, the deliquescent material may be added in dry powder form to a molten organic polymer, as described below.

In another embodiment, a composition in accordance with the present invention may be formed by admixing the components comprising a hygroscopic material and a molten organic polymer to form a fluid admixture, and cooling the fluid admixture to a non-fluid or solid state. In this embodiment, a selected organic polymer, such as PVOH, may be gradually heated in a suitable vessel until it melts or becomes semi-fluid. A selected hygroscopic material in a desired amount (e.g., 25–75 wt % of the total composition) may then be added to the molten organic polymer, and the combination mixed together while maintaining elevated temperature so as to form a homogenous mixture. This homogenous mixture may then be allowed to cool so as to form the composition.

The compositions of the present invention may further include additional components. For example, the compositions may also comprise a chemical substance that changes color upon absorption of water, such as cobalt chloride or other salt. Such a chemical substance may indicate whether or not the desiccant needs replacement and/or recharging. As is appreciated by those skilled in the art, cobalt chloride (i.e., $CoCl_2$) is normally blue when desiccated and red or pink when hydrated. Stated somewhat differently, a color change associated with such novel compositions may be used to indicate the degree to which the desiccant composition has absorbed water because cobalt chloride will slowly turn pink upon absorbing water due to the formation of various colored hydrates, finally leading to the pink hexahydrate, $CoCl_2.6H_2O$. In a preferred embodiment, the amount of cobalt chloride added is about 1%–2% by weight of the total composition. The cobalt chloride may be directly added to the aqueous solution of PVOH and $CaCl_2$ or $CH_3COOK$ during the cook and stir process as described above.

In addition to cobalt chloride, the compositions of the present invention may also include other materials to maintain its physical integrity (i.e., desired shape and form), where such solid support materials include (but are not limited to): paper product, wood products, natural or synthetic sponges, cotton, synthetic fibers, charcoal, pumice, porous rock, and the like. In general, the above-identified novel compositions are coupled to such other materials by an impregnation technique. More specifically, one or more of the hygroscopic materials of the present invention may be mixed with a suitable solvent to yield a solution, and the solution may then be used to impregnate the solid support by, for example, immersing the solid support into the solution until it is saturated (the solid support may then be dried). In a preferred embodiment, the hygroscopic material consists essentially of polyvinyl alcohol, the solvent consists essentially of water, and the solid support consists essentially of a paper product like cardboard. However, it is to be understood that other techniques may be employed to couple the hygroscopic material with the solid support, such as through the use of a suitable coupling agent like, for example, an adhesive.

The compositions of the present invention as disclosed herein, including those compositions that have been impregnated to a solid support, may be formulated into a wide variety of different desired shapes and sizes. For example, the novel composition may be formulated into disk shapes and adapted to fit inside the lid of a container (e.g., within the interior space of a bottle or container cap). An advantage associated with forming the compositions into disks is that such shapes may be securely affixed within the interior space of product containers having a specialty good in need of moisture protection. For example, and in the context of internal compartments associated with electronic equipment in need of moisture protection, such disks may be affixed to the end of a removable plug, such as a threaded plug. The removable plug, in turn, may then be securely fastened to the compartment (thereby eliminating the undesirable consequences associated with bagged desiccants that shift or move about during transportation). Moreover, and to facilitate the determination of whether or not the composition useful as a desiccant needs replacement and/or recharging, the removable plug may be made of a translucent thermoplastic material such that the disk is visible.

In general, the compositions of the present invention may be formulated into any desired shape. For example, some types of electronic equipment may be best served by affixing one of the novel compositions disclosed herein to a part or portion that is regularly replaced, such as a battery or a portion of a battery compartment. In the context of camera equipment, the desiccant may be placed in the film cartridge. In some instances, a composition according to the present invention in solution form may be poured directly into a chamber or compartment, and then oven dried so as to be useful as a desiccant.

For purposes of illustration and not limitation, the following examples more specifically disclose various aspects of the present invention.

EXAMPLES

Example 1
Comparing Desiccation Ability of Granular PVOH and Granular Silica Gel in a Water Vapor Permeable Receptacle.

Two eight ounce vitamin pill bottles each received 5.0 milliliters of water. The interior of each lid received a water vapor permeable receptacle, one with 0.9 gram of powdered PVOH, and the other with 1.0 gram of silica gel. Each lid was weighed before and about twenty-four hours after being tightened down onto the bottles. The PVOH sample gained 0.25 gram of water representing a gain of 27%, while the silica gel sample gained 0.25 gram of water representing a gain of 25%. The results indicate that the PVOH sample provided improved desiccation over the silica gel sample.

Example 2
Results of Desiccation of Cardboard Impregnated with PVOH.

A solution of PVOH was prepared by blending approximately 10 grams of PVOH with approximately 90 gram of water. The mixture was then placed in a double boiler system wherein the PVOH dissolved within about 30 minutes during a cook and stir process. An eight ounce vitamin pill bottle cap cardboard insert was removed, weighed, immersed in the aqueous solution of PVOH, dried, weighed again, and replaced onto the bottle having previously received 5.0 milliliters of water. Weight differential revealed that the cardboard insert had received 0.2 gram of dried PVOH. After a period of about four days the PVOH impregnated cardboard insert gained 0.25 gram of water representing an increase of 125%.

Example 3
Results of Desiccation of Corrugated Cardboard Impregnated with PVOH.

A solution of PVOH was prepared by blending approximately 10 grams of PVOH with approximately 90 gram of water. The mixture was then placed in a double boiler system wherein the PVOH dissolved within about 30 minutes during a cook and stir process. An eight ounce vitamin pill bottle cap cardboard insert was notched so that a 2 inch deep, one inch wide corrugated cardboard strip could be suspended into the vitamin pill bottle without contacting the 5.0 milliliters of water on the bottom of the bottle. The corrugated cardboard was dried, weighed, immersed in an aqueous solution of PVOH, dried, weighed again, affixed to the cardboard lid insert, and tightened onto the bottle having previously received five milliliters of water. After a period of about three days the corrugated cardboard was again weighed. The corrugated cardboard received 0.2 gram of dried PVOH that gained 0.3 gram of water representing an increase of 150%.

Example 4
Desiccation Effectiveness of Different Paper, PVOH, and Two Different Mass Ratios of PVOH and $CaCl_2$.

The two mass ratios of PVOH:$CaCl_2$ specifically 44:56 and 60:40, were prepared. The first step was the preparation of two PVOH solutions. A 12% solution of PVOH was prepared by blending about 12 grams of PVOH with about 88 grams of water and a 10% solution by blending about 10 grams of PVOH with about 90 grams of water and then each was placed in a double boiler system and dissolved in a cook and stir process for about 30 minutes. The 44:56 ratio solution was prepared by dissolving together 50 grams of a 12% PVOH solution with 46.2 grams of water and 3.8 grams of $CaCl_2$. The 60:40 solution was prepared by dissolving together 200 grams of a 10% solution of PVOH, 50 grams of water, and 25.5 grams of $CaCl_2$. The cardboard lid inserts were removed from eight eight-ounce vitamin pill bottles and replaced with four sheets of standard wood fiber copy paper in the odd numbered samples and four sheets of standard cotton fiber copy paper in the even numbered samples. The sheets were cut to fit the lids securely. The new paper inserts from samples 1 and 2 were controls, 3 and 4 were immersed in a solution of PVOH/$CaCl_2$ in a mass ratio of 44:56, 5 and 6 were immersed in a solution of PVOH/$CaCl_2$ in a mass ratio of 60:40, and 7 and 8 were immersed in a solution of PVOH. The papers immersed in solutions were dried to moisture loss stability in a 175° F. oven. Weights of dry treated and untreated papers were recorded, bottles received five milliliters of water, caps were fastened, and weight gains were recorded after about 46 hours. A slight gain in weight of the control papers was noted and the masses subtracted from the gains in the treated papers in order to isolate the desiccation effect of the PVOH and the two examples of the novel composition. The following is a list of the samples and their percent of water vapor gain:

PVOH/$CaCl_2$ mass ratio 44:56 wood paper=279%

PVOH/$CaCl_2$ mass ratio 44:56 cotton paper=300%

PVOH/$CaCl_2$ mass ratio 60:40 wood paper=275%

PVOH/$CaCl_2$ mass ratio 60:40 cotton paper=253%

PVOH wood paper=160%

PVOH cotton paper=160%

Although many specific details of certain embodiments of the invention have been set forth in the foregoing detailed description, those skilled in the art will recognize that the present invention may have additional embodiments, or that the invention may be practiced without several of the details described herein. Furthermore, while the products and methods of the present invention have been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

I claim:

1. A method for removing moisture from an enclosed and moisture-containing atmosphere comprising contacting the atmosphere with a composition useful as a desiccant that comprises a hygroscopic material dispersed in polyvinyl alcohol, wherein the polyvinyl alcohol is in an amount that ranges from about 44 percent to up to about 100 percent by weight of the composition.

2. The method of claim 1 wherein the hygroscopic material is moisture deficient.

3. The method of claim 1 wherein the polyvinyl alcohol is moisture deficient.

4. The method of claim 1 wherein the hygroscopic material comprises one or more of calcium chloride, phosphorous oxide, sodium silicate, potassium silicate, potassium acetate, bentonite, montmorillonite clay, silica gel, molecular sieve, monohydric compounds, or polyhydric compounds.

5. The method of claim 1 wherein the hygroscopic material comprises calcium chloride.

6. The method of claim 1, wherein the hygroscopic material comprises potassium acetate.

7. The method of claim 1, wherein about 44–75 wt % of the composition is the hygroscopic material, and about 75–44 wt % of the composition is polyvinyl alcohol, wherein the wt % values are based on the total weight of the hygroscopic material and polyvinyl alcohol.

8. The method of claim 1 further comprising a solid support, wherein a mixture of hygroscopic material and polyvinyl alcohol are distributed across a surface of the solid support.

* * * * *